March 15, 1966 W. L. GARFIELD 3,241,069

F.M. RECEIVER NOISE SUPPRESSION CIRCUIT

Filed Nov. 5, 1962

Inventor
WILLIAM L. GARFIELD
By [signature]
Attorney

United States Patent Office 3,241,069
Patented Mar. 15, 1966

3,241,069

F.M. RECEIVER NOISE SUPPRESSION CIRCUIT

William Littery Garfield, London, England, assignor to International Standard Electric Corporation, New York, N.Y., a corporation of Delaware Filed Nov. 5, 1962, Ser. No. 235,485
Claims priority, application Great Britain, Nov. 10, 1961, 40,395/61
4 Claims. (Cl. 325—347)

This invention relates to radar receivers of the type having a frequency counter to count the transitions of a cyclically frequency modulated signal wave through a particular level, and an amplitude limiter arranged before the frequency counter.

The information obtained from the output of such receivers is liable to error in the presence of pulse-type interference owing to the production of spurious transitions of the received signal.

A reduction in the effect of the interference pulses may be obtained by integrating and amplitude-limiting the signal before applying it to the frequency counter.

It has been found that the integrating process is itself liable to introduce errors in the information obtained. This is because if the frequency modulation of the signal is not perfectly sinusoidal, the excursions of the integrated signal voltage about the mean integrated signal voltage are not symmetrical, and the integrated signal voltage wave may sometimes fall outside the dynamic range of the amplitude limiter. Whenever this occurs the transitions of the signal will not be recorded by the frequency counter.

The present invention provides a means of clamping the mean level of the integrated signal and thereby effecting a reduction in the number of errors.

According to the invention there is provided a frequency modulated radar receiver including an integrator circuit, a frequency counter, a clamp circuit connected between the integrator circuit and the counter, and means to connect a signal of constant amplitude with respect to a particular level from the clamp circuit to the frequency counter.

Figure 1:
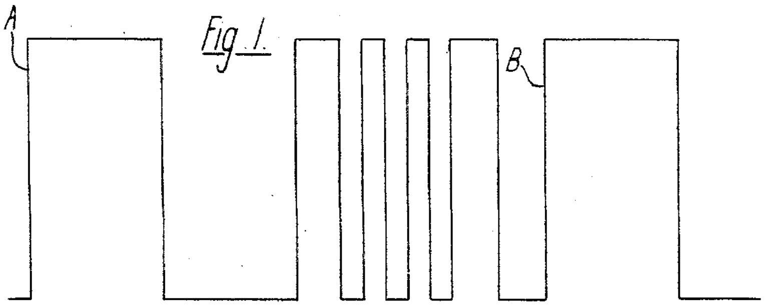
Figures 2, 3:
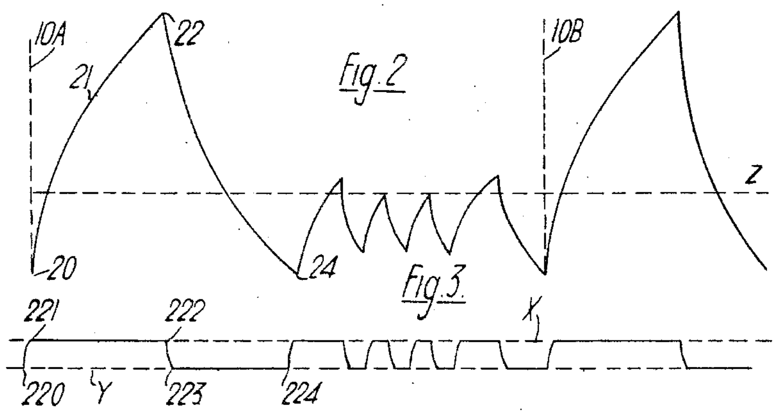
Figure 4:
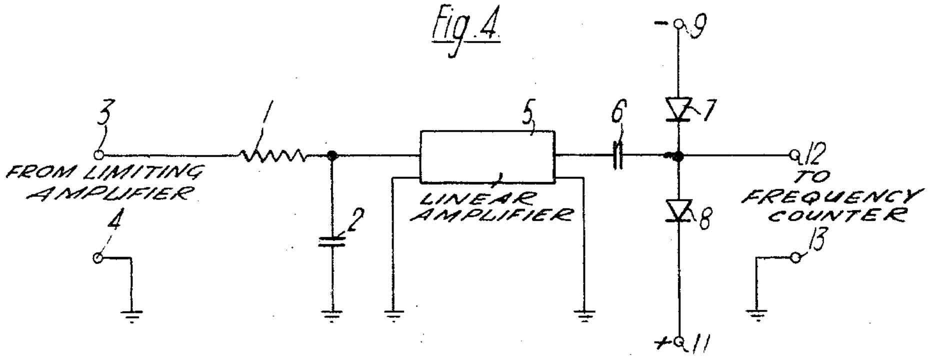

An embodiment of the invention together with wave forms illustrating its operation will now be described with reference to the accompanying drawing in which:

FIG. 1 represents the waveform of a frequency modulated signal present in a radio altimeter receiver, FIG. 2 represents the waveform, after integration, of the signal illustrated in FIG. 1, FIG. 3 represents the waveform, after clamping, of the signal illustrated in FIG. 2, and FIG. 4 is a schematic representation of part of a radio altimeter receiver circuit.

Referring to FIG. 4 there is shown an integrator circuit comprising a resistor 1 and a capacitor 2 and having input terminals 3 and 4, terminal 3 being connected to one terminal of the resistor 1 and terminal 4 being connected to ground. One plate of the capacitor 2 is connected to ground, the other plate is connected to a second terminal of the resistor 1. A linear amplifier 5 has input terminals connected, one to the junction of the resistor 1 and the capacitor 2, and the other to ground. The amplifier 5 has output terminals, one connected to one plate of a capacitor 6, and the other connected to ground. A second plate of the capacitor 6 is connected to the junction point of two semi-conductor diodes 7 and 8. The anode of the diode 7 is connected to the negative terminal 9 of a D.C. source (not shown) which has one terminal at ground potential. The cathode of the diode 8 is connected to the positive terminal 11 of the D.C. source (not shown).

The cathode of the diode 7 is connected to the anode of the diode 8.

The diodes 7 and 8 in conjunction with the two D.C. sources and the capacitor 6 form a clamp circuit, having one output terminal 12 connected to the junction point of the two diodes and a second output terminal 13 connected to ground.

The arrangement shown in FIG. 4 forms part of a radio altimeter equipment, installed in an aircraft. A frequency modulated signal is generated in the modulator of a radio altimeter transmitter and is radiated towards the ground. The radiated signal is reflected from the ground and picked up by a receiving antenna attached to the aircraft. The signal received by reflection from the ground is fed to the radio altimeter receiver, where it is beaten in a mixer stage with a second signal from the transmitter which reaches the receiver by transmission along a cable of known electrical length connected between the transmitter and the receiver. A frequency modulated beat frequency signal is extracted from the output of the mixer. The average frequency of the beat signal depends upon the altitude of the aircraft, and this is determined by counting the number of transitions through a given level of the beat frequency which occur over a period equal to one cycle of the modulating frequency.

The transitions are counted in a counter of the cup-and-bucket integrator type. With counters of this type it is necessary that the applied signal amplitude is substantially constant. In one particular radio altimeter equipment the average frequency of the beat signals varies between 1 kc./s. and 100 kc./s., and the modulating frequency is 300 c./s.

The beat signal is amplified and limited in a limiting amplifier stage, from the output of which a substantially rectangular wave signal is obtained. A representation of the waveform of the output signal from the limiting amplifier is shown in FIG. 1. The time interval between the vertical edges A and B of the signal wave is equivalent to one half-cycle of the modulating signal. The number of rectangular waves which actually occur over one half-cycle of the modulating signal is always many times greater than the number shown in FIG. 1. Each of the vertical edges of the signal wave represents a transition of the beat signal and is required to be counted by the counter. Interference pulses superimposed on the signal wave shown in FIG. 1 would, if of sufficient amplitude, be recorded by the frequency counter in the same way as wanted transitions of the signal wave.

In order to reduce the amplitude of any interference pulses superimposed on the signal wave, the amplitude-limited beat signal is passed to the input terminals 3 and 4 of the integrator, circuit shown in FIG. 4. The waveform of the signal after integration in the integrator circuit, comprising the resistor 1 and the capacitor 2, is represented in FIG. 2. The vertical dotted lines 10A and 10B in FIG. 2 are coincident in time with the vertical edges, A and B, of the signal waveform before intergration, shown in FIG. 1.

The amplitude of the integrated signal wave is inversely proportional to the signal frequency; the amplitude of the integrated signal therefore varies over one half-cycle of the modulating frequency as shown in FIG. 2.

The horizontal dotted line Z represents the mean level of the integrated signal wave over a period corresponding to one half-cycle of the modulating signal frequency. Due to the fact that the modulating signal wave is not perfectly sinusoidal the integrated signal waves becomes non-symmetrically displaced with respect to the mean value of the integrated signal level. The distortion of the modulating signal wave is due to mechanical tolerances in the frequency modulator.

At a later time the waveform of the signal shown in FIG. 1 may be reversed and cause some of the integrated waves to lie wholly above the line Z.

The integrated signal wave shown in FIG. 2 must be amplified, amplitude limited and converted to a substantially rectangular waveform before application to the frequency counter. If the signal were amplified about its mean level and applied directly to an amplitude limiter of the type which is responsive to a small fraction of the maximum voltage excursion of an applied signal wave about a mean value, some of the transitions of the signal wave would not be present in the output from the limiter.

In this embodiment of invention, the integrated signal is applied to the linear amplifier 5 and after amplification therein is fed via the capacitor 6 to a clamp circuit comprising the semi-conductor diodes 7 and 8 and their associated D.C. supplies. The clamp circuit confines the level of the integrated signal between two clamping levels which are dependent upon the characteristics of the diodes 7 and 8 and the magnitudes of the D.C. reverse biasses applied to them.

FIG. 3 represents the waveform of the output signal from the clamp at terminals 12 and 13. The level of the signal is confined between the upper clamping voltage represented by the horizontal dotted line X and the lower clamping voltage level represented by the horizontal dotted line Y. The points 220, 221, 222 and 224 indicated on the waveform represented in FIG. 3 corresponds in time to the points 20, 21, 22 and 24 respectively, indicated on the waveform represented in FIG. 2.

At an instant in time corresponding to the vertical line 10A in FIG. 2, the magnitude of the integrated signal wave at the output terminals of the amplifier 5 is indicated by the point 20, and the magnitude of the signal wave at terminals 12 and 13 is represented by the point 220. The diode 7 is conducting and the capacitor 6 is charged to a potential equivalent to the potential difference between the lower clamping level Y and the signal voltage at 20. As the magnitude of the integrated signal wave changes from the value indicated by 20 towards that indicated by 21, the potential at terminals 12 and 13 rises from its value at the point 220 towards the value at the point 221, which corresponds to the upper clamping voltage level indicated by the dotted line X.

When the magnitude of the signal at the output terminals of the amplifier 5 has reached the value indicated by the point 21, the positive bias on the cathode of the diode 8 is overcome and the diode conducts, whilst the potential at terminals 12 and 13 is held at the upper clamping level.

The potential at the output terminals of the linear amplifier 5 rises up to a peak value at the point 22. The capacitor 6 is then charged to a potential equal to the potential difference between the voltage magnitude of the integrated signal wave at 22 and the upper clamping voltage level represented by the line X. As the magnitude of the amplified integrated signal wave decreases from the point 22 towards the point 23, the potential difference between terminals 12 and 13 decreases from the value indicated by the point 222 on FIG. 3 towards that indicated by the point 223. When the magnitude of the amplified integrated signal wave decreases further the diode 7 conducts again at the point 223, and the magnitude of the signal at terminals 12 and 13 is held at the lower clamping voltage level until the magnitude of the amplified integrated signal reaches the point 24.

The above sequence of operations is repeated for each integrated signal wave and the output at terminals 12 and 13 contains the required beat signal transitions with the amplitude variations removed.

The capacitance of the capacitor 6 is chosen so that when either of the diodes 7 and 8 is conducting the potential difference developed across the capacitor closely follows the rise or fall of the integrated signal wave, whilst when the diodes 7 and 8 are both non conducting the potential difference across the capacitor 6 decays slowly in comparison with the rate of rise or fall of the signal wave. Thermionic diodes may be used in place of semiconductor devices for 7 and 8.

The output signal wave from the clamp is then amplified in a second amplifier and shaped into a rectangular waveform in a second amplitude limiter and applied to the freqeuncy counter.

If required the output signal wave from terminals 12 and 13 may be D.C. restored without the loss of signal transitions counts.

The second amplifier and second amplitude limiter following the clamp circuit whilst necessary in this embodiment of the invention in order to meet the requirements of the particular frequency counter used, are not inherently essential integers of the invention. In some frequency modulated radar receiver systems it may be possible to couple the output terminals of the clamp circuit directly to the input terminals of the frequency counter. Similarly the linear amplifier 5 is not an inherently essential integer of the invention and may be omitted when the amplitude of the beat signal after integration is always sufficient to operate the clamp effectively.

If the amplitude of the output signal voltage required from the clamp circuit is small, of the order of 1 volt peak-to peak, say, it is sometimes possible to dispense with the D.C. sources connected to terminals 9 and 11, and to connect both these terminals to the common side of the signal source. When the instantaneous magnitude of the signal voltage wave applied in the forward direction to one side of the diodes 7 and 8 is below a certain value the corresponding forward resistance of the diode is relatively high. When the instantaneous magnitude of the signal voltage wave applied to the diode increases, the forward resistance of the diode decreases and the diode clamps the signal voltage at the required fixed level.

In a co-pending patent application Serial No. 208,739, filed July 10, 1962, there is described an interference pulse suppression circuit arrangement for use in a radio altimeter receiver of the type mentioned in this specification. In this circuit arrangement the effect of an integrator circuit on the beat signal is progressively reduced as the frequency of the beat signal is raised above a particular value. The effect of the integrator circuit on the beat signal is controlled by placing a frequency responsive network in parallel with the integrator circuit, the impedance of the network decreasing progressively as the average frequency of the beat signal increases above the particular value, a point being reached at which the integrator circuit is effectively short-circuited by the parallel circuit. Over a range of frequencies close to this frequency the beat signal is severely attenuated in the integrator circuit during the highest frequency part of the frequency modulation cycle. The clamp circuit has been found to be particularly valuable in avoiding loss of transition counts when the altitude of the aircraft is such that the beat signal frequency falls within the above frequency range.

It is to be understood that the foregoing description of specific examples of this invention is not to be considered as a limitation on its scope.

What I claim is:

1. A noise suppression circuit for a frequency modulated radar receiver including a frequency counter, comprising an integrator circuit, a clamp circuit, said clamp circuit including two elements having non-linear current-voltage characteristics, each element have a plurality of terminals, said elements connected in series-aiding at one terminal of each of said elements, a capacitor connected between said integrating circuit at the junction of said two elements, and circuit means to apply a potential difference between other terminals of each of said two elements and ground of a value such that both said elements are non-conducting in the absence of a voltage from said integrating circuit, whereby the output signal from said clamp circuit is of a constant amplitude between two fixed levels.

2. A noise suppression circuit for frequency modulated radar receiver according to claim 1 in which a linear amplifier is inserted between the integrator circuit and said capacitative means.

3. A noise suppression circuit for frequency modulated radar receiver according to claim 2 in which the said elements are semi-conductor diodes.

4. A noise suppression circuit for frequency modulated radar receiver according to claim 3 in which the potential difference between each of the other terminals of the said semi-conductor diodes and ground is zero.

References Cited by the Examiner

UNITED STATES PATENTS

| | | | |
|---|---|---|---|
| 2,448,322 | 8/1948 | Piety | 328—127 |
| 2,560,378 | 7/1951 | White | 329—126 |
| 3,094,667 | 6/1963 | Brown | 328—54 |
| 3,113,274 | 12/1963 | Utt | 307—88.5 |

DAVID G. REDINBAUGH, *Primary Examiner.*